United States Patent [19]
Schrenk

[11] 3,746,485

[45] July 17, 1973

[54] APPARATUS FOR THE PRODUCTION OF NET-LIKE STRUCTURES

[75] Inventor: Walter J. Schrenk, Bay City, Mich.

[73] Assignee: The Dow Chemical Company, Midland, Mich.

[22] Filed: Apr. 22, 1971

[21] Appl. No.: 136,372

Related U.S. Application Data

[62] Division of Ser. No. 856,513, July 16, 1969, Pat. No. 3,609,509, which is a division of Ser. No. 505,674, Oct. 29, 1965, Pat. No. 3,498,873.

[52] U.S. Cl. ........... 425/131, 264/167, 264/DIG. 81, 425/133, 425/382 N
[51] Int. Cl. .............................................. B29f 1/12
[58] Field of Search .................... 425/109, 381, 382, 425/133, 131, 382 N; 264/167, DIG. 81; 161/109; 156/167; 259/9

[56] References Cited
UNITED STATES PATENTS
3,130,959   4/1964   Schrenk et al. ...................... 259/9 X
3,308,220   3/1967   Smith .......................... 264/DIG. 81

*Primary Examiner*—H. A. Kilby, Jr.
*Attorney*—Griswold & Burdick, Richard G. Waterman and Robert B. Ingraham

[57] ABSTRACT

This invention relates to apparatus for the production of thermoplastic net comprising bonded filaments which have at least two different thermoplastic components disposed in generally spirally arranged alternating layers wherein the material of one of the layers is mono-directionally oriented and the remaining material is generally unoriented.

5 Claims, 9 Drawing Figures

INVENTOR.
Walter J. Schrenk
BY
AGENT

PATENTED JUL 17 1973 3,746,485

INVENTOR.
Walter J. Schrenk
BY
AGENT

APPARATUS FOR THE PRODUCTION OF NET-LIKE STRUCTURES

This application is a divisional application of my copending application Ser. No. 856,513, filed July 15, 1969, now U.S. Pat. No. 3,607,509, which in turn is a divisional application of my prior application Ser. No. 505,674, filed Oct. 29, 1965, now U.S. Pat. No. 3,498,873.

This invention relates to apparatus for the production of net-like structures and more particularly relates to apparatus for the manufacture of net or net-like fabric from organic plastic melts.

A variety of processes are known for the production of net-like structures by extrusion of an organic plastic melt. Some of such processes which are concerned with the production of a tubular net are described in U.S. Pat. Nos. 2,919,467; 3,089,804 and the like. Such tubular net is prepared by the extrusion of plastic melt through rotating extrusion orifices which periodically coincide or by the extrusion of filaments which are combined after emerging from the die and are still in heat plastified form.

As yet, no ideal singular synthetic organic thermoplastic resinous material has been devised which provides all the desired physical properties. Oftentimes, it is desired to provide net having an appearance substantially significantly different from that which can be obtained from a singular melt and also it is oftentimes desired to provide a net wherein the individual strands have improved physical characteristics over net obtainable with a single synthetic resinous thermoplastic material.

These benefits and other advantages in accordance with the present invention are achieved by employing an apparatus for extruding the synthetic resinous thermoplastic net, the apparatus comprising in cooperative combination a means to supply at least first and second heat plastified streams of synthetic resinous thermoplastic material, a housing, the housing defining an internal generally cylindrical passageway having a first end and a second end, the housing defining a first plurality of passageways providing communication between the first end of the passageway and the first polymer supply means and a second plurality of passageways providing communication between the second polymer supply source and the first end of the annular passageway, the first plurality of passageways communicating with the first polymer source being in generally alternating arrangement with the second polymer source, a rotor having a first end a second end, the rotor being rotatably mounted with the housing passageway, the housing and the rotor defining an annular passageway, the first end of the rotor being disposed adjacent the first end of the passageway, the second end of the rotor being disposed adjacent the second end of the passageway, the housing defining a plurality of extrusion apertures adjacent the second end of the passageway, the rotor defining a plurality of extrusion orifices adjacent the second end of the rotor and means to rotate the rotor relative to the housing.

Further features and advantages of the present invention will become more apparent from the following specification when taken in connection with the drawing wherein.

Figure 1:
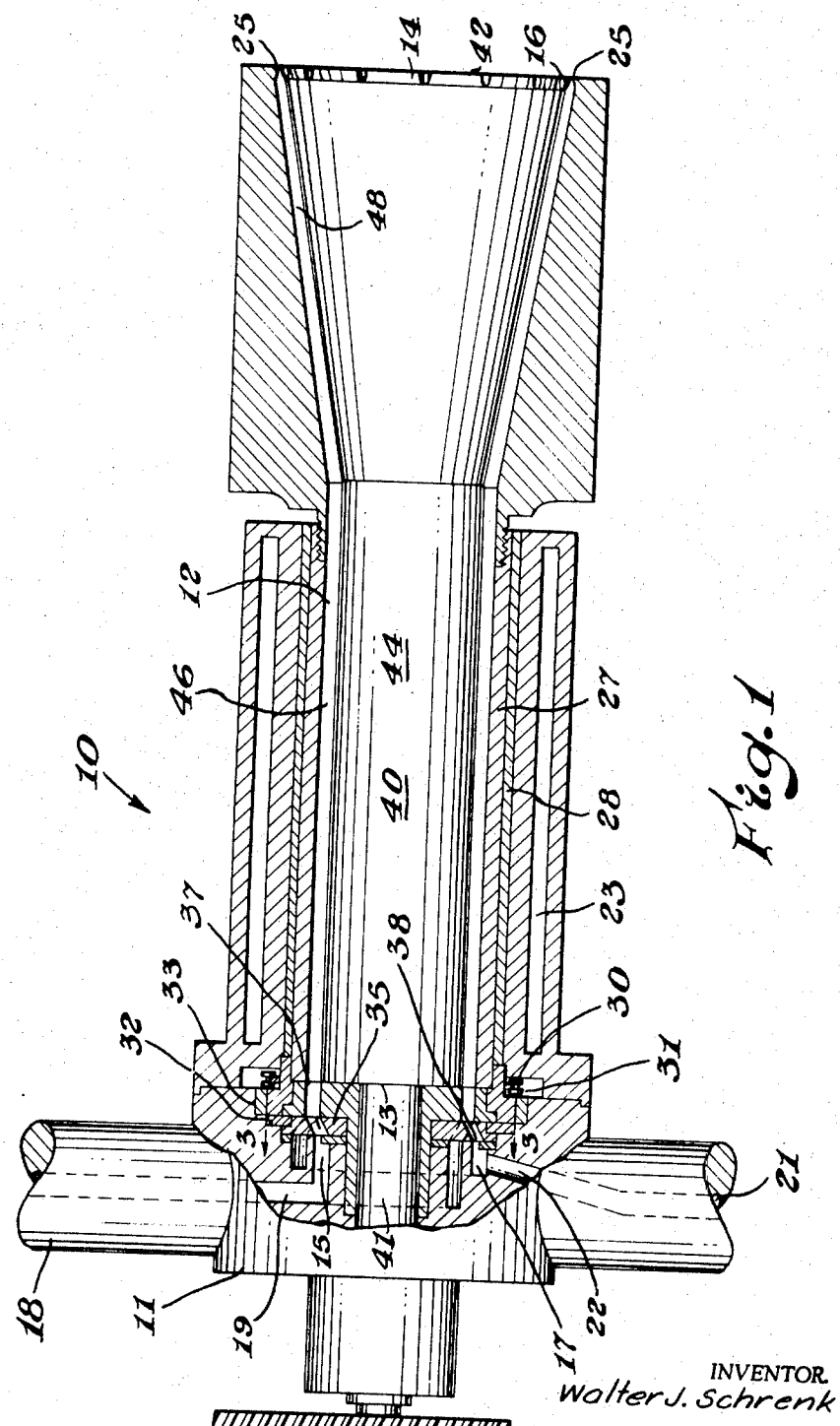
FIG. 1 illustrates an apparatus generally in accordance with the present invention.
Figure 2:
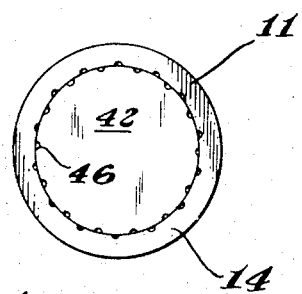
FIG. 2 is an end view of the terminal portion of the apparatus of FIG. 1.

In FIG. 1 there is illustrated an apparatus in accordance with the invention generally designated by the reference numeral 10. The apparatus 10 comprises in cooperative combination a housing 11. The housing 11 defines an internal generally cylindrical passageway 12 having a first end 13 and a second end 14. The housing 11 defines a first polymer passageway or plenum 15 disposed generally adjacent the first end 13 of the passageway 12. A second polymer passageway or pluenum 17 is generally concentrically disposed about the first polymer passageway 15. The passageway 15 is in operative communication with a first polymer source 18 by means of a passageway 19 defined by the housing 11. The plenum or distribution chamber 17 is in communication with a second polymer source 21 by means of a passageway 22 defined by the housing 11. The housing 11 defines an internal annular cavity 23 particularly suited and adapted to receive a heat exchange fluid. The housing 11 generally adjacent the second end 14 defines a plurality of extrusion orifices 25 which are in full communication with the second end 14 of the passageway 12. A cylindrical sleeve 27 is disposed within the passageway 12 and is journaled therein by means of a bearing 28. A driving means or sprocket 30 is secured to the sleeve 27 and is adapted to be rotated by means of a power source or drive chain 31. The drive means or sprocket 30 is secured in the passageway 13 by means of bearings 32 and 33. A distributor ring or feed port block 35 is disposed adjacent the first end 13 of the passageway 12. The feed port block 35 defines first and second pluralities of passageways 37 and 38 in alternating arrangement. The passageways 37 provide communication from the plenum 15 with the peripheral portion of the passageway 12 adjacent the end 13 while the passageways 38 provide communication between the plenum 17 and the first end 13 of the passageway 12 and discharge thereinto in an alternating fashion. A rotor 40 having a first end 41 and a second or terminal end 42 is disposed within the passageway 12 of the housing 11. The rotor 40 has an outer generally cylindrical surface 44 which in cooperation with the inner surface of the sleeve 27 defines an internal annular extrusion passageway 46 within the housing 11. A plurality of extrusion orifices 47 are defined by the second end 42 of the rotor 40. The extrusion orifices 47 are disposed in a circular manner and generally adjacent the orifices 25 adjacent the terminal end 42 of the rotor and the terminal end 14 of the passageway 12. The annular passageway 46 has an outwardly flaring tapered section 48. In FIG. 2 there is illustrated a view of the second end 42 of the rotor 40 and of the passageway 14 of the housing 11 showing the momentary relationship between the extrusion orifices 25 and 42.

Figure 3:
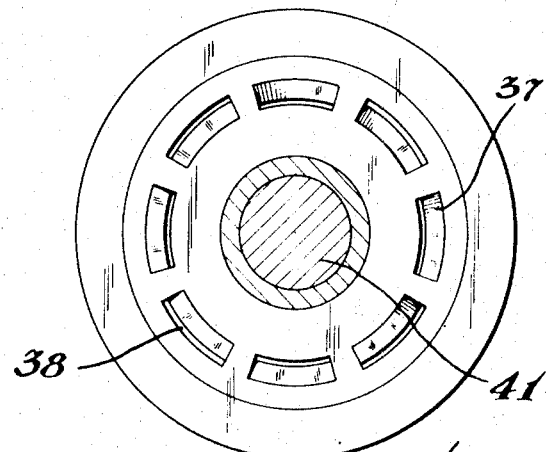
FIGS. 3, 4 and 5 depict alternate feed arrangements which are employed with the apparatus of FIG. 1.

FIG. 3 is a view of the feed port block 35 taken along the line 3—3 illustrating the relationship between the passageways 37 and 38.

In operation of the apparatus as illustrated in FIGS. 1, 2 and 3, a first thermoplastic resinous material from the source 18 flows through the passageway 19 and the plenum 15 through the passageway 37 of the distributor block 35 and into the annular passageway 46, through the passageway 46 and is extruded from the orifices 25 and 46. A second heat plastified synthetic resinous material is supplied by the polymer source 21 to the passageway 22 which in turn passes to the plenum 17 and through the passageway 38 of the feed block 35. As the diverse polymers are supplied to alternating passageways, the composite stream formed within the passageway 46 has a longitudinally striped configuration. Rotation of the rotor 40 causes the elements of the first polymer and the second polymer to be wound about the rotor in a generally spiral fashion, causing them to be stretched and thinned. As the polymer passes from the first end 13 to the second end 14 of the passageway 12, the speed of rotation relative to the rate of feed is readily adjusted to provide a heat-plastified stream adjacent the second end 42 of the rotor having a configuration of a multilayer tube with laminae spiraling from the inside surface to the outer surface.

Figure 7:
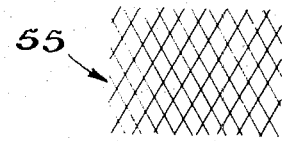
FIG. 7 is a schematic representation of a portion of net prepared by employing apparatus in accordance with the invention.

Beneficially, rotation of either the rotor 40 or the sleeve 27 causes the orifices 25 and 46 to periodically coincide resulting in the extrusion of a net-like structure. A net-like structure is obtained when the rotor is rotated, the sleeve is rotated or if both the sleeve and rotor are rotated at a different rate, or if the sleeve and rotor are rotated in opposite directions at a like or different rate. In order to obtain a net-like structure such as is illustrated in FIG. 7, the rate of rotation of the rotor and the sleeve is the same and the direction of rotation is opposite. By varying the relative rates of rotation of the sleeve and the rotor, and the feed rate of materials thereto, varying intertwined spiral patterns are obtained in the cross-section of the resultant net.

Figure 4:
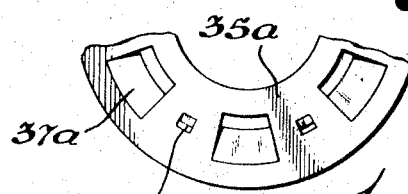

Employing the feed block of FIG. 3, each filament of the net obtained has both of the plastic components generally equally disposed adjacent the surface thereof. Oftentimes it is desirable to maintain a higher proportion of one polymer adjacent the surface. An arrangement is illustrated in FIG. 4 which depicts a view of an alternate feed block designated 35a having a plurality of passageways 37a and 38a defined therein. The passageways 38 a are adapted to provide communication with the plenum 17 whereas the passageways 37a provide communication with the passageway 15. Thus, the resultant stream within the annular passageway 46 without motion of either the rotor 40 or the sleeve 27 results in a tubular or annular stream of synthetic resinous thermoplastic material supplied from the source 18 having encapsulated therein streams of material supplied from the second polymer source 21. On relative rotation of the rotor 40 and the sleeve 27, the portions of the stream of the second polymer; that is, the polymer issuing from the passageways 38a, are extended to form a plurality of layers encapsulated within a continuous phase of the first polymer issuing from the passageways 37a.

Figure 5:
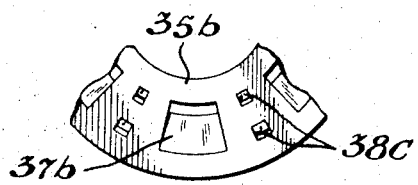

FIG. 5 depicts an alternate embodiment of a feed block designated as 35b having a plurality of passageways 37b and 38c. In a manner similar to the results achieved in FIG. 4, a plurality of layers of material issuing from the ports 38c are encapsulated within the material issuing from the ports 37b and on relative rotation of the rotor 40 and the sleeve 27, a stream is obtained which has an outer layer of the material from the first polymer source, an inner layer comprising a plurality of layers of the material from the second polymer source, a layer of material from the first polymer source 18, a further layer or laminae of the material from the second polymer source interspersed with the material from the first polymer source and a fifth layer or inner layer of material from the first polymer source. Thus, the material of the first polymer source is a matrix containing two layers of spirally arranged alternating layers of material from the first and second polymer sources.

Figure 6:
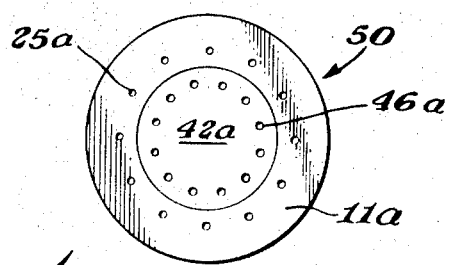
FIG. 6 depicts an alternate configuration of the terminal end of the apparatus of FIG. 1.

FIG. 6 depicts an alternate configuration of the terminal portion of the apparatus 10 generally designated by the reference numeral 50 showing a rotor terminal portion 42a and a housing terminal portion 11a. The housing terminal portion 11a has disposed therein a plurality of passageways 25a which are in communication with the internal annular passageway such as the passageway 46. The terminal portion of the rotor 42a has a plurality of passageways 46a which are also in communication with the internal annular passageway 46. The embodiment of FIG. 6 is particularly suitable for the preparation of net in accordance with the general procedure set forth in U.S. Pat. No. 3,089,804, wherein the net is formed externally to the die rather than as it leaves the die in the case of the embodiments of FIGS. 1, 2 and 3. The feed block as illustrated in FIG. 5 is particularly advantageous and beneficial when employed with the modification illustrated in FIG. 6 as the streams of the polymer emerging from the orifices 25a and 46a comprises material from the ports 37b; that is, the first polymer source, is disposed in higher proportion at the surface of the filament and partially encapsulates a number of intertwined layers of material from the first and second polymer sources, and in cases where the polymers from the first and second sources do not readily adhere to each other, a bond is obtained between the filaments of the net as the outer portion of each of the filaments contains a predominant amount of material from the first polymer source.

In FIG. 7 there is schematically illustrated a portion of net generally designated by the reference numeral 55 prepared by either the embodiments of FIGS. 1, 2 and 3, or the modification of FIG. 6 when rotation of the rotor and sleeve is maintained at an equal rate but in opposite directions.

Figure 8:
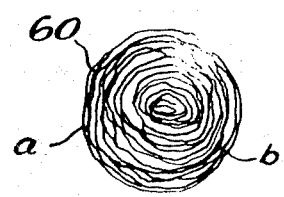
FIGS. 8 and 9 are enlarged schematic cross-sections of net filaments prepared by employing the apparatus of the invention.

In FIG. 8 there is illustrated a schematic enlarged sectional view of the terminal portion of a filament of a net such as the net 55 generally designated by the reference numeral 60. The filament 60 is composed of a plurality of layers a and b which are intertwined and each of the layers a and b terminate generally adjacent the outer surface of the filament.

Figure 9:
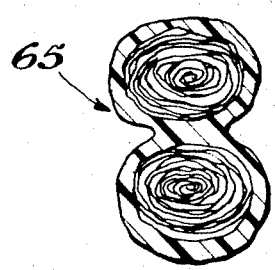

In FIG. 9 there is illustrated a cross-sectional configuration of bonded filaments generally designated by the reference numeral 65. The filaments 65 are prepared employing the apparatus 10 with the exception that the feed block 35 has been replaced with the feed block 35a. The filament 65 comprises an outer layer of material designated as a from the first polymer source and an inner region of alternating spirally disposed layers of material a and material b. The filaments, in accordance with FIG. 9 are also prepared when the apparatus of FIG. 1 is modified to incorporate the feed block arrangement 35b in conjunction with the arrangement of extrusion orifices illustrated in FIG. 6.

By way of further illustration, a plurality of nets are prepared having a configuration generally as illustrated in FIG. 7. The following combinations are found to give high strength nets resistant to fibrillation: high density polyethylene and low density polyethylene; Nylon 66 and polyethylene; Nylon 66 and polyvinylchloride; Nylon 66 and a blend of 80 parts of polystyrene and 20 parts of butadiene rubber; Nylon 6 and a copolymer of 85 parts vinyl chloride and 15 parts vinyl acetate; polypropylene and polyethylene; polypropylene and a copolymer of 80 parts of polyvinyl chloride and 20 parts butyl acrylate; polypropylene and a blend of 80 parts of polystyrene and 20 parts by weight of butadiene rubber; polystyrene and polyethylene; a copolymer of 90 parts by weight vinylidene chloride and 10 parts by weight vinyl chloride and polyethylene; and a copolymer of 90 parts by weight vinylidene chloride and 10 parts by weight vinyl chloride and a copolymer of 85 parts of vinyl chloride and 15 parts of vinylidene chloride. In each case, the temperature of the extruded stream was maintained at the otpimum temperature for the orientation of orientable phase. Nets of high tensile strength are obtained and they exhibit great resistance to fibrillation. The resultant products on sectioning had a configuration generally resembling that of FIG. 8, wherein intertwined layers of the two polymers are attained in the individual filaments of the net. The product beneficially may be heat treated and stretched in the conventional manner to attain desirable physical properties arising from orientation at suitable temperatures.

In order to attain a net having a maximum service life, it is desirable to employ as one component, an orientable material which is relatively rigid and a softer material such as high pressure polyethylene or a plasticized polyvinyl chloride. By treating the extruded net in a manner which favors maximum physical properties by mono-directional orientation of the orientable compoent, generally the net exhibits the high tensile strength of the orientable components and elongation of the softer or less rigid component. It is not necessary that the polymers adhere to each other strongly, as the extrusion is accomplished in the absence of an atmosphere and beneficially the layers within the polymer have a thickness of from about 0.001 mil, and beneficially 0.2 mil.

Beneficially, extruded net in accordance with the present invention is readily produced employing a wide variety of oriented polymers. Typical oriented polymers or components which are utilized in the production of two component nets in accordance with the present invention include polypropylene, polystyrene, styrene; including Nylon 66, the condensed products of hexamethylene diamine and adipic acid, Nylon 77, polycaprolactam or Nylon 6, crystalline vinylidene chloride polymers such as a copolymer of 85 weight percent of vinylidene chloride and 16 weight percent vinyl chloride; linear polyesters such as polyethylene terephthalate, rubber hydrochloride; copolymers of styrene and acrylonitrile such as a copolymer containing 72 weight percent styrene and 28 weight percent acrylic acid, rigid polyvinyl chloride, polymethyl methacrylate, polycarbonates, irradiated polyethylene, polyvinyl fluoride and the like.

Beneficial for the non-oriented, poorly oriented or synthetic oriented components, advantageously there is employed plasticized polyvinyl chloride, polyethylene, rubbers of both the natural and synthetic variety, copolymers of ethylene and propylene, copolymers of ethylene and ethyl acrylate and like materials.

The thickness of the layers in the net filaments is readily controlled by the relative rate of rotation of the mandrel or rotor and the outer housing and the rate of throughput of the molten polymer. Thus, if the rotational rate is excessive relative to the throughput rate, a product is obtained which is apparently a single phase material when the layers become vanishingly thin. As the relative rate of rotation is reduced with constant throughput, the layer thickness is increased.

Employing the modification of FIG. 6 and the feed block of FIG. 4 in the apparatus of FIG. 1, polyethylene is fed from the feed ports 37a and the polystyrene feed ports 38a. The proportion of polyethylene to polystyrene is about 1 to 1.5. The resultant net filaments have a configuration such as is generally illustrated in FIG. 9. Excellent adhesion is obtained at the junctions between the filaments and the resulting net exhibits a high tensile strength and elongation.

By utilizing polymers of diverse color and/or refractive index, net having unique appearance is obtained.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. An apparatus for the extrusion of synthetic resinous thermoplastic net, wherein the individual filaments of the net comprise diverse intertwined polymer compositions, the apparatus comprising in cooperative combination means to supply a first stream of heat plastified material, means to supply a second stream of a heat plastified material, a housing defining an internal generally cylindrical passageway having a first end and a second end, the housing defining a first plurality of passageways providing communication between the first end of the passageway and the first polymer supply means, a second plurality of passageways providing communication between the second polymer supply source and the first end of the annular passageway, the passageways communicating with the first polymer source being in generally alternating arrangement with the passageway communicating with the second polymer source, a rotor having a first end and a second end, the rotor being rotatably mounted within the housing passageway, the housing and the rotor defining an annular passageway, the first end of the rotor being disposed adjacent a first end of the passageway, the second end of the rotor being disposed adjacent the second end of the passageway, the housing defining a plurality of extrusion apertures adjacent the second end of the passageways, the rotor defining a plurality of extrusion orifices adjacent the second end of the rotor, and means to rotate the rotor relative to the housing.

2. The apparatus of claim 1 wherein the inner portion of the housing defining the annular passage is rotatably disposed within the housing.

3. The apparatus of claim 1 wherein the extrusion orifices of the rotor and of the housing are so positioned as to periodically coincide when the rotor and housing are rotated relative to one another.

4. The apparatus of claim 1 wherein the passageways in communication with the first polymer source have a dimension in a direction normal to the axis of the cylindrical passageway greater than that of the passageways in communication with the second polymer source.

5. The apparatus of claim 1 wherein the housing defines at least a first annular plenum and a second annular plenum, the first plenum being in communication with the means to supply the first heat plastified stream and the annular passageway, usually the second plenum being in communication with the means to supply the heat plastified stream and the annular passageway.

* * * * *